(12) United States Patent
Onoe et al.

(10) Patent No.: US 10,156,170 B2
(45) Date of Patent: Dec. 18, 2018

(54) EXHAUST GAS PURIFICATION DEVICE AND PARTICULATE FILTER

(71) Applicant: CATALER CORPORATION, Kakegawa-shi, Shizuoka (JP)

(72) Inventors: Ryota Onoe, Kakegawa (JP); Shingo Sakagami, Kakegawa (JP); Tsuyoshi Ito, Kakegawa (JP); Tatsuya Ohashi, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 145 days.

(21) Appl. No.: 15/100,716

(22) PCT Filed: Dec. 1, 2014

(86) PCT No.: PCT/JP2014/081785
§ 371 (c)(1),
(2) Date: Jun. 1, 2016

(87) PCT Pub. No.: WO2015/083671
PCT Pub. Date: Jun. 11, 2015

(65) Prior Publication Data
US 2016/0298512 A1    Oct. 13, 2016

(30) Foreign Application Priority Data

Dec. 2, 2013   (JP) .................................. 2013-249170

(51) Int. Cl.
*F01N 3/02*   (2006.01)
*F01N 3/022*  (2006.01)
(Continued)

(52) U.S. Cl.
CPC ......... *F01N 3/0222* (2013.01); *B01D 46/247* (2013.01); *F01N 3/035* (2013.01);
(Continued)

(58) Field of Classification Search
CPC ............. F01N 2250/02; F01N 2260/06; F01N 2330/30; F01N 2330/34; F01N 3/0222; F01N 3/035; B01D 46/247
(Continued)

(56) References Cited

U.S. PATENT DOCUMENTS

| | | | |
|---|---|---|---|
| 7,491,373 B2 * | 2/2009 | Ketcham ............... | F01N 3/0222 422/168 |
| 2006/0185335 A1 | 8/2006 | Ichikawa | |
| 2012/0251767 A1 * | 10/2012 | Ishikawa ............ | B01D 46/2429 428/116 |

FOREIGN PATENT DOCUMENTS

| | | |
|---|---|---|
| CN | 101384330 A | 3/2009 |
| CN | 101535606 A | 9/2009 |
| | (Continued) | |

OTHER PUBLICATIONS

Jan. 27, 2015 International Search Report issued in International Patent Application No. PCT/JP2014/081785.
(Continued)

*Primary Examiner* — Phutthiwat Wongwian
*Assistant Examiner* — Diem Tran
(74) *Attorney, Agent, or Firm* — Oliff PLC

(57) ABSTRACT

The exhaust gas purification device provided with a particulate filter disposed in an exhaust passage of an internal combustion engine and capturing particulate matter in exhaust gas discharged from the internal combustion engine. The particulate filter is provided with a wall-flow part having an inlet-side cell that is open only at an end on an exhaust gas inflow side, an outlet-side cell that is adjacent to this inlet-side cell and is open only at an end on an exhaust gas outflow side, and a porous wall that partitions the inlet-side cell from the outlet-side cell, and is also provided with a straight-flow part having a through cell that penetrates the filter in an axial direction thereof and is open at the end on the exhaust gas inflow side as well as the end on the exhaust gas outflow side.

10 Claims, 10 Drawing Sheets

(51) Int. Cl.
  *F01N 3/035*   (2006.01)
  *B01D 46/24*   (2006.01)

(52) U.S. Cl.
  CPC ...... *F01N 2250/02* (2013.01); *F01N 2260/06* (2013.01); *F01N 2330/30* (2013.01); *F01N 2330/34* (2013.01)

(58) Field of Classification Search
  USPC .................................................. 60/297, 311
  See application file for complete search history.

(56) References Cited

FOREIGN PATENT DOCUMENTS

| | | |
|---|---|---|
| EP | 2371441 A1 | 10/2011 |
| JP | H06-182204 A | 7/1994 |
| JP | 2003-148127 A | 5/2003 |
| JP | 2003-210992 A | 7/2003 |
| JP | 2006-231162 A | 9/2006 |
| JP | 2010-510429 A | 4/2010 |
| JP | 2011-522694 A | 8/2011 |
| JP | 2011-169156 A | 9/2011 |
| JP | 2012-205973 A | 10/2012 |
| WO | 2007/094499 A1 | 8/2007 |
| WO | 2008/060563 A2 | 5/2008 |
| WO | 2009/148498 A1 | 12/2009 |
| WO | 2013/111793 A1 | 8/2013 |

OTHER PUBLICATIONS

Jun. 7, 2016 International Preliminary Report on Patentability issued in International Patent Application No. PCT/JP2014/081785.
Jan. 11, 2018 Office Action issued in Chinese Patent Application No. 201480066036.8.

* cited by examiner

EXHAUST GAS PURIFICATION DEVICE AND PARTICULATE FILTER

TECHNICAL FIELD

The present invention relates to an exhaust gas purification device that is disposed in an exhaust passage of an internal combustion engine. More particularly, the present invention relates to an exhaust gas purification device that is provided with a particulate filter that captures particulate matter in the exhaust gas discharged from an internal combustion engine.

This international application claims priority based on Japanese Patent Application No. 2013-249170 filed Dec. 2, 2013, and the contents of this application are incorporated in their entirety in the present Description by reference.

BACKGROUND ART

It is generally known that, inter alia, particulate matter (PM), which has carbon as its main component, and ash, which is composed of uncombusted components, are present in the exhaust gas discharged from internal combustion engines and are a cause of air pollution. Due to this, the regulations on particulate matter emission levels, along with those on harmful components present in exhaust gas, e.g., hydrocarbon (HC), carbon monoxide (CO), and nitrogen oxides (NOx), are becoming more rigorous with each passing year. Art has thus been proposed for capturing and thereby removing this particulate matter from exhaust gases.

For example, a diesel particulate filter (DPF) for capturing this particulate matter has been disposed in the exhaust passage of diesel engines. In addition, gasoline engines discharge a certain amount of particulate matter with their exhaust gas, although this amount is smaller than for diesel engines, and as a consequence in some instances a gasoline particulate filter (GPF) is also installed in the exhaust passage of gasoline engines. Particulate filters having a wall-flow structure are known here; these are constructed from a large number of cells composed of a porous substrate wherein the inlets and outlets of the large number of cells are blocked in alternation. In a wall-flow particulate filter, the exhaust gas that has entered through a cell inlet passes through the porous cell walls provided as partitions and is discharged towards and at a cell outlet. While the exhaust gas is traversing the porous cell walls, the particulate matter is captured and removed at the wall surface and in the pores in the interior of the wall. Patent Literature 1 is an example of this type of prior art.

CITATION LIST

Patent Literature

[Patent Literature 1] Japanese Patent Application Laid-open No. 2003-210992

SUMMARY OF INVENTION

There is, however, a limit on the amount of particulate matter that can be captured by the cell wall in the wall-flow particulate filter described above, and when particulate matter accumulates in the filter in an amount exceeding this, filter clogging occurs and a large pressure loss then appears. This can result in the appearance of adverse effects such as a deterioration in the fuel consumption efficiency (fuel efficiency) and engine problems. Due to this, with, for example, DPFs, once a prescribed amount of particulate matter has accumulated in the filter, filter regeneration is carried out by establishing a high-temperature exhaust gas flow and burning off the particulate matter. With GPFs, for example, filter regeneration is performed by burning off the particulate matter during a fuel cut-off interval.

However, when, for example, a satisfactory regeneration treatment has not been performed due to control deficiencies, or when an operating condition with a relatively low exhaust temperature has persisted, e.g., during engine start up or idling, an abnormal PM accumulation occurs and filter clogging then occurs and this results in the problem of an increased pressure loss. Increases in the pressure loss are desirably kept as small as possible in order to prevent adverse effects such as a deterioration in fuel efficiency and engine problems.

The present invention was pursued considering these points, and its primary object is to provide, for the instant particulate filter and for an exhaust gas purification device equipped with this particulate filter, a novel structure that can suppress pressure loss increases even when filter clogging occurs.

The exhaust gas purification device provided by the present invention is an exhaust gas purification device disposed in an exhaust passage of an internal combustion engine and provided with a particulate filter capturing particulate matter in an exhaust gas discharged from the internal combustion engine. This particulate filter is typically disposed downstream from a catalyst section containing a platinum group metal (PGM). This particulate filter is provided with a wall-flow part that includes an inlet-side cell that is open only at an end on an exhaust gas inflow side, an outlet-side cell that is adjacent to the inlet-side cell and that is open only at an end on an exhaust gas outflow side, and a porous wall that partitions the inlet-side cell from the outlet-side cell; and is provided with a straight-flow part including a through cell that penetrates the filter in an axial direction thereof and that is open at the end on the exhaust gas inflow side as well as the end on the exhaust gas outflow side.

Due to this construction, the exhaust gas preferentially flows in the straight-flow part when the accumulation of particulate matter (PM) has advanced in the wall-flow part into which exhaust gas has been introduced, and because of this the increase in the pressure loss can be kept low for the particulate filter as a whole. In addition, the exhaust gas flows in the straight-flow part even when the wall-flow part has become completely clogged, and because of this the maximum value of the pressure loss can be kept low. This makes it possible to prevent adverse effects such as a deterioration in fuel efficiency and engine problems. Accordingly, an exhaust gas purification device that exhibits a higher level of performance can be provided.

A preferred aspect of the herein disclosed exhaust gas purification device is configured such that an amount of exhaust gas passing through the straight-flow part is 0.1% to 10% (preferably at least 1% and not more than 10% and more preferably at least 3% and not more than 8%) when 100% (volume) is a total amount of exhaust gas passing through the filter. Stated differently, it is configured such that the amount of exhaust gas passing through the wall-flow part is 90% to 99.9% (preferably at least 90% and not more than 99% and more preferably at least 92% and not more than 97%). Due to this construction, the ratio between the amount of exhaust gas passing through the straight-flow part and the amount of exhaust gas passing through the wall-flow part assumes a favorable balance, and because of this the filter performance-improving effect due to the disposition of the straight-flow part (for example, the restraining effect on the increase in pressure loss due to PM accumulation) can be favorably exhibited while PM is captured in an appropriate amount by the wall-flow part. Accordingly, a better filter performance can then be reliably exhibited.

In a preferred aspect of the herein disclosed exhaust gas purification device, the wall-flow part has a plurality of the inlet-side cells and a plurality of the outlet-side cells disposed in alternation in a grid form. In addition, each of through cells is disposed between an inlet-side cell and an inlet-side cell adjacent thereto and between an outlet-side cell and an outlet-side cell adjacent thereto, disposed along the diagonal direction of the grid formed by the inlet-side cells and outlet-side cells. Due to this construction, exhaust gas overflowing from the wall-flow part rapidly flows into the through cells and as a consequence an even better restraint on pressure loss increases can be exercised. That is, the effects of the present invention can be exhibited at an even higher level.

In a preferred aspect of the herein disclosed exhaust gas purification device, the through cell cross section orthogonal to the axial direction of the filter has a quadrilateral shape and the inlet-side cell cross section orthogonal to the axial direction of the filter and the outlet-side cell cross section orthogonal to the axial direction of the filter have an octagonal shape. Due to this construction, an efficient cell arrangement can be realized in the limited cell-occupied space of the filter. This can also contribute to reducing the size of the exhaust gas purification device.

In a preferred aspect of the herein disclosed exhaust gas purification device, in the cross section of the filter orthogonal to its axial direction, the cross-sectional areas of the through cells present in an outer peripheral region of this cross section are larger than the cross-sectional areas of the through cells present in a central region of the cross section. Due to this construction, the exhaust gas flowing in the straight-flow part of the outer peripheral region of the filter assumes a high flow rate in high operating load regions for the internal combustion engine. Pressure loss increases in high operating load regions can be effectively restrained as a consequence.

In a preferred aspect of the herein disclosed exhaust gas purification device, a cross section of the filter orthogonal to its axial direction is approximately circular, and, when the radius of this cross section is defined as R, the aforementioned central region is defined as a region from the center of the cross section to at least ½R of the radius R, and the aforementioned outer peripheral region is defined as a region from the outer edge of the cross section to at least ⅕R of the radius R. Pressure loss increases due to PM accumulation can be restrained even better by defining the central region and the outer peripheral region in this manner.

A preferred aspect is configured such that where 100% (volume) is a total amount of exhaust gas passing through the central region, an amount of exhaust gas passing through the straight-flow part of the central region is not more than 10%. Due to this construction, the ratio in the central region of the filter between the amount of exhaust gas passing through the wall-flow part and the amount of exhaust gas passing through the straight-flow part assumes a favorable balance, and because of this the previously described effects can be realized even more favorably.

In another preferred aspect, the configuration is such that when 100% (volume) is a total amount of exhaust gas passing through the outer peripheral region, an amount of exhaust gas passing through the straight-flow part of the outer peripheral region is 1% to 15%. Due to this construction, the ratio in the outer peripheral region of the filter between the amount of exhaust gas passing through the wall-flow part and the amount of exhaust gas passing through the straight-flow part assumes a favorable balance, and because of this pressure loss increases can be restrained without lowering the PM trapping efficiency.

In a preferred aspect of the herein disclosed exhaust gas purification device, the cross-sectional areas of the respective through cells in the outer peripheral region are approximately equal to one another and are uniformly larger than the cross-sectional areas of the through cells in the central region. Pressure loss increases can be simply and easily suppressed when such an exhaust gas purification device is used.

In a preferred aspect of the herein disclosed exhaust gas purification device, in the filter, through cells are formed which have cross-sectional areas gradually increasing from the center of the aforementioned cross section toward the outer edge. The use of such an exhaust gas purification device makes it possible to bring about a more sensitive tuning of the amount of exhaust gas passing through the through cells (straight-flow part) in the filter moving from the center of the cross section to its outer edge. This in turn makes possible a more reliable and secure suppression of pressure loss increases.

The present invention also provides a particulate filter preferred for use in the aforementioned exhaust gas purification device. That is, this is a particulate filter disposed in an exhaust passage of an internal combustion engine and capturing particulate matter in the exhaust gas discharged from the internal combustion engine. This particulate filter includes a wall-flow part including an inlet-side cell that is open only at an end on an exhaust gas inflow side, an outlet-side cell that is adjacent to the inlet-side cell and that is open only at an end on an exhaust gas outflow side, and a porous wall that partitions the inlet-side cell from the outlet-side cell, and includes a straight-flow part containing a through cell that penetrates the filter in an axial direction thereof and that is open at the end on the exhaust gas inflow side as well as the end on the exhaust gas outflow side. The use of such a particulate filter makes it possible to realize a high-performance exhaust gas purification device that can prevent—even when the wall-flow part is clogged—adverse effects such as a deterioration in fuel efficiency and engine problems.

DESCRIPTION OF EMBODIMENTS

Preferred embodiments of the present invention are described below based on the figures. Matters required for the execution of the present invention but not particularly described in this Description (for example, general matters such as those related to the disposition of particulate filters in automobiles) can be understood as design matters for the individual skilled in the art based on the conventional art in the pertinent field. The present invention can be implemented based on the contents disclosed in this Description and the common general technical knowledge in the pertinent field.

Figure 1:
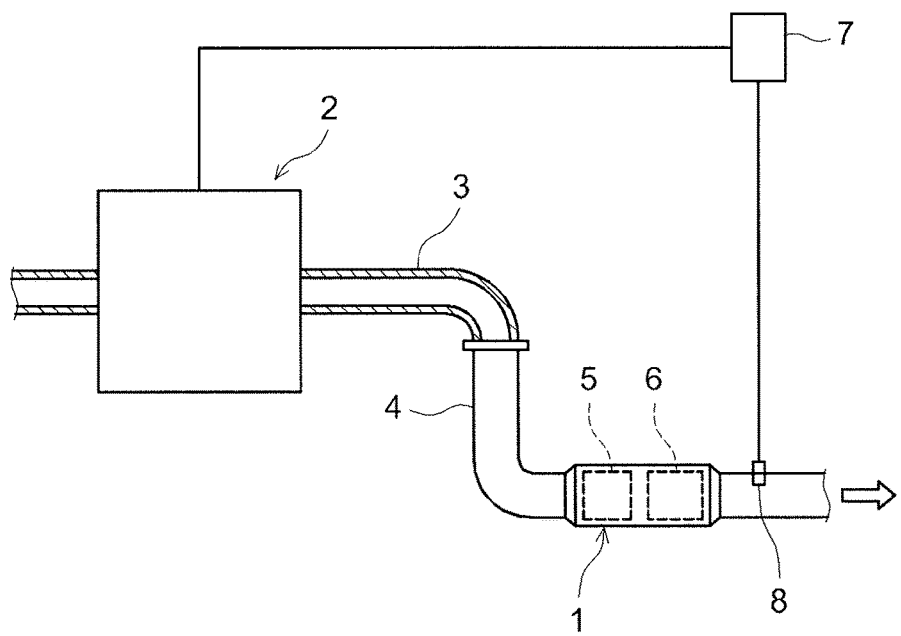
FIG. 1 is a diagram that schematically shows an exhaust gas purification device according to an embodiment.

First, the construction of an exhaust gas purification device according to an embodiment of the present invention is described with reference to FIG. 1. The herein disclosed exhaust gas purification device 1 is disposed in the exhaust system of an internal combustion engine. FIG. 1 is a diagram that schematically shows an internal combustion engine 2 and the exhaust gas purification device 1 disposed in the exhaust system of this internal combustion engine 2.

A mixture containing oxygen and fuel gas is fed to the internal combustion engine (engine) according to the present embodiment. The internal combustion engine causes this mixture to undergo combustion and converts the energy of combustion to mechanical energy. When this occurs, the post-combustion mixture becomes an exhaust gas and is discharged into the exhaust system. The internal combustion engine 2 with the structure shown in FIG. 1 has an automotive gasoline engine as its main component, but an engine other than a gasoline engine (for example, a diesel engine) can also be used.

The exhaust system in this engine 2 is described as follows. An exhaust manifold 3 is connected to an exhaust port (not shown) through which the engine 2 communicates with the exhaust system. The exhaust manifold 3 is connected to an exhaust pipe 4 through which the exhaust gas flows. The exhaust passage of the present embodiment is formed by the exhaust manifold 3 and the exhaust pipe 4.

The herein disclosed exhaust gas purification device 1 is disposed in the exhaust system of the engine 2. This exhaust gas purification device 1 is provided with a catalyst section 5, a filter section 6, and an ECU 7 and purifies harmful components (for example, carbon monoxide (CO), hydrocarbon (HC), and nitrogen oxides ($NO_x$)) present in the discharged exhaust gas and also captures the particulate matter (PM) present in the exhaust gas.

The ECU 7 is a unit that carries out control between the engine 2 and the exhaust gas purification device 1 and contains as constituent elements a digital computer and other electronic devices that are the same as for common control devices. Specifically, an input port is provided at the ECU 7 and is electrically connected to sensors (for example, a pressure sensor 8) that are disposed at respective locations at the engine 2 and/or the exhaust gas purification device 1. By doing this, the data detected at the individual sensors is transmitted via the input port to the ECU 7 as electrical signals. In addition, the ECU 7 is also provided with an output port. Via this output port, the ECU 7 is connected to individual locations at the engine 2 and the exhaust gas purification device 1 and controls the operation of the individual members through the transmission of control signals.

The catalyst section 5 is constructed to have a purification capacity for the three-way components (NOx, HC, CO) present in the exhaust gas and is disposed in the exhaust pipe 4, which communicates with the engine 2. As shown in FIG. 1, it is specifically disposed on the downstream side of the exhaust pipe 4. The type of catalyst section 5 is not particularly limited. For example, the catalyst section 5 may be a catalyst in which a precious metal, e.g., platinum (Pt), palladium (Pd), rhodium (Rh), and so forth, is supported. A downstream catalyst section may additionally be disposed in the exhaust pipe 4 downstream from the filter section 6. The specific construction of this catalyst section 5 is not a characteristic feature of the present invention, and a detailed description here has therefore been omitted.

The filter section 6 is disposed downstream from the catalyst section 5. The filter section 6 is provided with a gasoline particulate filter (GPF) that can capture and remove the particulate matter (referred to below simply as "PM") present in the exhaust gas. The particulate filter according to the present embodiment is described in detail in the following.

Figure 2:
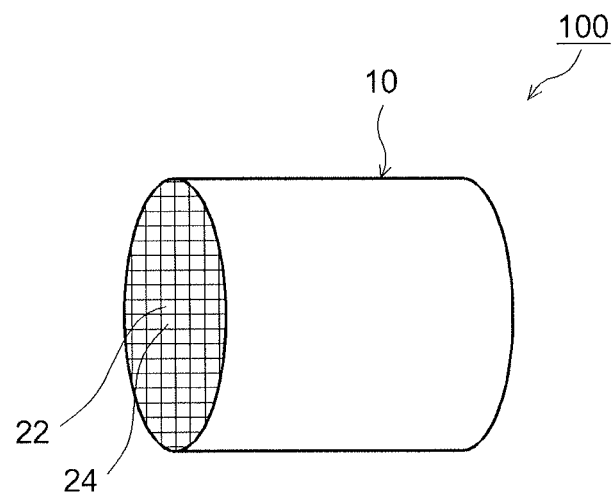
FIG. 2 is a perspective diagram that schematically shows a filter according to an embodiment.

FIG. 2 is a perspective diagram of a particulate filter 100. As shown in FIG. 2, this particulate filter 100 is provided with a filter substrate 10 and, disposed in the interior of this filter substrate 10, cells 22, 24 in a regular arrangement. The various materials and shapes heretofore used in applications of this type can be used for this filter substrate 10 constituting the herein disclosed particulate filter. For example, a honeycomb substrate provided with a honeycomb structure formed from a ceramic, e.g., cordierite, silicon carbide (SiC), and so forth, or an alloy (e.g., stainless steel and so forth) can be advantageously used. A honeycomb substrate having a cylindrical shape for its outer shape (present embodiment) is provided as an example. However, in place of a cylindrical shape, an elliptical shape or polygonal tubular shape may be used for the outer shape of the substrate as a whole.

Figure 3:
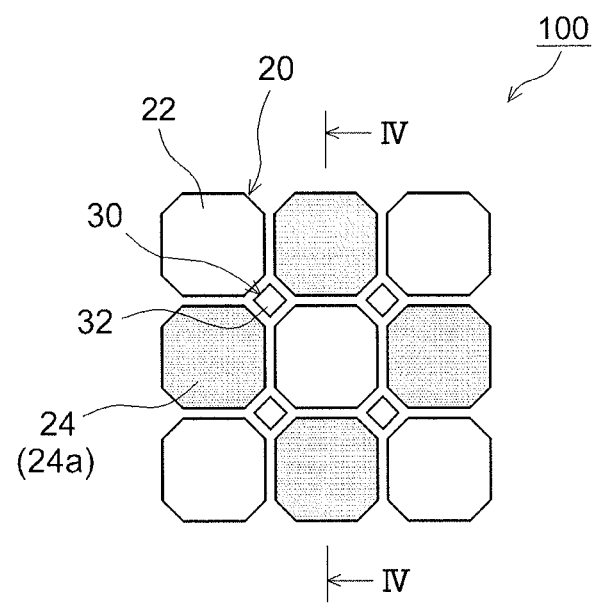
FIG. 3 is a diagram that schematically shows the relevant portion of the end face of a filter according to an embodiment.
Figure 4:
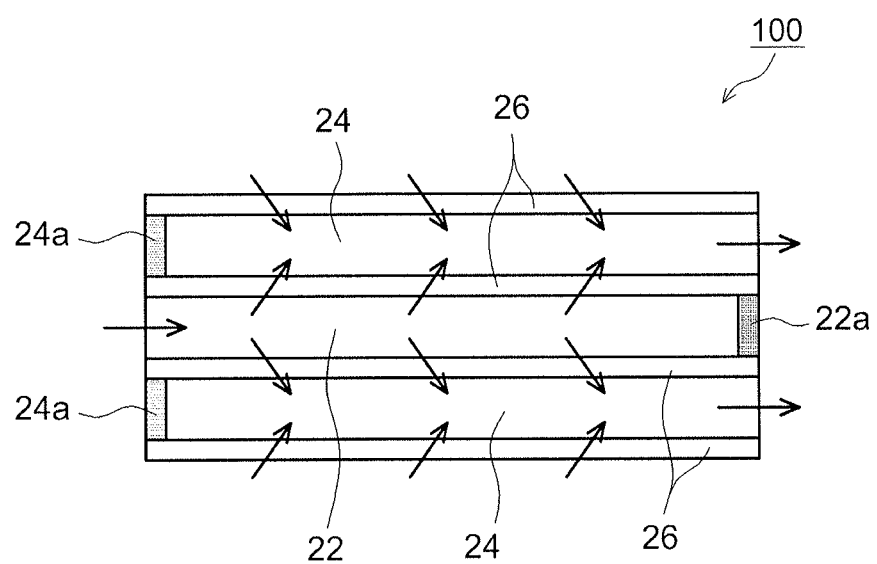
FIG. 4 is a diagram that schematically shows the IV-IV cross section of FIG. 3.

FIG. 3 is a schematic diagram of an enlargement of a portion of the end face of the particulate filter 100 on the exhaust gas inflow side. FIG. 4 is a diagram of the IV-IV cross section of FIG. 3. As shown in FIG. 3, the particulate filter 100 has a wall-flow part 20 and a straight-flow part 30.

<The Wall-Flow Part>

As shown in FIG. 3 and FIG. 4, the wall-flow part 20 is a location where adjacent cells 22, 24 are plugged at the end faces opposite from one another at the two end faces of the filter substrate 10, and has an inlet-side cell 22, an outlet-side cell 24, and a wall 26. In this embodiment, a plurality of inlet-side cells 22 and a plurality of outlet-side cells 24 are disposed in alternation in a grid form.

An inlet-side cell 22 is open only at the end on the exhaust gas inflow side, while an outlet-side cell 24 resides adjacent to an inlet-side cell 22 and is open only at the end on the exhaust gas outflow side. In this embodiment, the end of the inlet-side cell 22 on the exhaust gas outflow side is plugged by a plugging part 22a, while the end of the outlet-side cell 24 on the exhaust gas inflow side is plugged by a plugging part 24a. The inlet-side cell 22 and the outlet-side cell 24 should be configured with an appropriate shape and size based on a consideration of the flow rate and components of the exhaust gas supplied to the filter 100. For example, the inlet-side cell 22 and the outlet-side cell 24 may have various geometric shapes, e.g., a quadrilateral shape such as a square shape, parallelogram shape, rectangular shape, trapezoidal shape, and so forth; a triangular shape; another polygonal shape (for example, a hexagonal shape or octagonal shape); or a circular shape. In this embodiment, the inlet-side cell 22 and the outlet-side cell 24 are octagonal cells having an octagonal shape for the cross section orthogonal to the axial direction of the filter substrate 10. In addition, the inlet-side cell 22 and the outlet-side cell 24 are respectively formed of cells having the same size (cross-sectional area) in the aforementioned cross section.

A wall 26 is formed between an adjacent inlet-side cell 22 and outlet-side cell 24. This wall 26 partitions the inlet-side cell 22 from the outlet-side cell 24. The wall 26 is a porous structure that permits the exhaust gas to pass through it. The porosity of the wall 26 is not particularly limited, but is suitably approximately 50% to 70% and is preferably 55% to 65%. When the porosity of the wall 26 is too small, PM may then end up slipping through; on the other hand, an excessively large porosity for the wall 26 is disfavored because the mechanical strength of the particulate filter 100 then assumes a declining trend. The thickness of the wall 26 is not particularly limited, but is preferably approximately 200 μm to 800 μm. Within this wall thickness range, an inhibitory effect on pressure loss increases can be obtained without a loss in the PM trapping efficiency.

<The Straight-Flow Part>

As shown in FIG. 3, the straight-flow part 30 is provided with a through cell 32 and is a location where the through cell 32 is not plugged at either end face of the filter substrate 10. In this embodiment, a plurality of through cells 32 are disposed along the diagonal directions of the grid formed by the inlet-side cells 22 and the outlet-side cells 24 and between an inlet-side cell 22 and an inlet-side cell 22 adjacent thereto and between an outlet-side cell 24 and an outlet-side cell adjacent 24 thereto.

The through cell 32 completely penetrates the filter 100 along its axial direction. In other words, unlike the inlet-side cell 22 and the outlet-side cell 24 described above, the through cell 32 is open at both its end on the exhaust gas inflow side and its end on the exhaust gas outflow side. The through cell 32 may be configured with an appropriate shape and size considering the flow rate and components of the exhaust gas supplied to the filter 100. For example, the through cell 32 may have various geometric shapes, e.g., a quadrilateral shape such as a square shape, parallelogram shape, rectangular shape, trapezoidal shape, and so forth; a triangular shape; another polygonal shape (for example, a hexagonal shape or octagonal shape); or a circular shape. The through cell 32 may have the same shape as or a different shape from the inlet-side cell 22 and the outlet-side cell 24. In this embodiment, the through cell 32 is a quadrilateral cell having a quadrilateral shape for its cross section orthogonal to the axial direction of the filter 100. In addition, the disposition in this embodiment is such that one side of the quadrilateral shape of the through cell 32 in this cross section is parallel to and opposite from one side of the octagonal shape of an inlet-side cell 22 and an outlet-side cell 24.

Also in this embodiment, the through cell 32 is formed by a cell that has a cross-sectional area in the aforementioned cross section that is smaller than that for the inlet-side cell 22 and the outlet-side cell 24. For example, the ratio (S2/S1) of the area S2 of the cross section of the through cell 32 orthogonal to the axial direction of the filter, to the area S1 of the cross section of the inlet-side cell 22 and the outlet-side cell 24 orthogonal to the axial direction of the filter is suitably not more than approximately 1/10, preferably not more than 3/100, and particularly preferably not more than 1/50. This area ratio (S2/S1) for the herein disclosed through cell 32, inlet-side cell 22, and outlet-side cell 24 preferably satisfies 1/300 (S2/S1) 1/10, more preferably satisfies 1/200 (S2/S1) 3/100, and particularly preferably satisfies 1/100 (S2/S1) 1/50. In this embodiment, the inlet-side cell 22 and the outlet-side cell 24 both have a cross-sectional area S1 of approximately 3.2 mm$^2$. The through cell 32, on the other hand, has a cross-sectional area S2 of approximately 0.05 mm$^2$. In this embodiment the cross-sectional area of the through cell 32 is thus uniformly smaller than that of the inlet-side cell 22 and the outlet-side cell 24. As described below, the through cell 32, the inlet-side cell 22, and the outlet-side cell 24 may be additionally provided with a catalyst coating layer (not shown) on the inner wall surface thereof. When any cell is provided with a catalyst coating layer, the aforementioned area ratio (S2/S1) should be satisfied for the total with the catalyst coating layer for the prescribed amount of the coating.

To produce the above-described filter 100, for example, a slurry may be prepared in which the main component is a ceramic powder, e.g., of cordierite, silicon carbide (SiC), and so forth, and this may be molded by, for example, extrusion molding, followed by firing. During this, the end on the exhaust gas outflow side of the inlet-side cell 22 may be plugged with a plugging part 22a and the end on the exhaust gas inflow side of the outlet-side cell 24 may be plugged with a plugging part 24a. The porous wall 26 may be formed by mixing a combustible material powder, e.g., a carbon powder, starch, or resin powder, into the slurry and then burning off the combustible material powder. The porosity of the wall 26 can be freely controlled at this point by changing the particle diameter and amount of addition of the combustible material powder.

As shown in FIG. 4, with this exhaust gas purification device the exhaust gas flows in from the inlet-side cell 22 disposed in the wall-flow part 20 of the filter 100. The exhaust gas that has flowed in through the inlet-side cell 22 passes through the porous wall 26 and reaches the outlet-side cell 24. In FIG. 4, the route by which the exhaust gas flowing in through the inlet-side cell 22 passes through the wall 26 and reaches the outlet-side cell 24 is shown by the arrows. Here, because the wall 26 has a porous structure, the PM is captured, during the passage of the exhaust gas through this wall 26, at the surface of the wall 26 and within the pores in the interior of the wall 26. The exhaust gas that has passed through the wall 26 and reached the outlet-side cell 24 is then discharged from the filter through the openings on the exhaust gas outflow side.

With this exhaust gas purification device, the exhaust gas continuously flows in through the inlet-side cell 22 disposed in the wall-flow part 20 of the filter 100. With the progress of PM capture by the wall 26 of the wall-flow part 20 as described above, PM accumulates at the surface of the wall 26 and within the pores in the interior of the wall 26. In addition, the exhaust resistance of the wall-flow part 20 increases as the PM accumulates at the wall-flow part 20, and because of this the amount of exhaust gas passing through the wall-flow part 20 declines and the exhaust gas overflowing from the wall-flow part 20 flows into the straight-flow part 30. Thus, as PM accumulation at the wall-flow part 20 advances in this exhaust gas purification device, the amount of exhaust gas flowing through the wall-flow part 20 declines and the exhaust gas assumes a preferential flow into the straight-flow part 30.

In this case, while a large pressure loss occurs at the PM-loaded wall-flow part 20, the pressure loss at the plug-free straight-flow part 30 is kept low. Due to this, the increase in the pressure loss can be kept small for the filter 100 as a whole. In addition, even when the wall-flow part 20 has become completely clogged, a small maximum value for the pressure loss can be achieved due to the flow of the exhaust gas in the straight-flow part 30. This then makes it possible to prevent adverse effects such as a deterioration in fuel efficiency and engine problems. An exhaust gas purification device having an even higher level of performance can therefore be provided.

In this case, for example, for the condition of an average flow rate of 3 to 20 m³/min, and letting the total amount of exhaust gas passing through the filter 100 be 100% (volume), the amount of exhaust gas passing through the straight-flow part 30 is preferably established at 0.1% to 10% (more preferably 2% to 5% and particularly preferably 3±1%). When the flow amount ratio for the exhaust gas is within this range, the ratio between the amount of exhaust gas passing through the straight-flow part 30 and the amount of exhaust gas passing through the wall-flow part 20 assumes a favorable balance and because of this the PM can be captured in a suitable amount by the wall-flow part 20 while the filter performance-improving effect (for example, the effect of suppressing pressure losses caused by PM accumulation) due to the disposition of the straight-flow part 30 can be favorably exhibited. An even better filter performance can then be reliably and securely exhibited.

In addition, a plurality of inlet-side cells 22 and a plurality of outlet-side cells 24 are disposed in alternation in a grid form in the wall-flow part 20 of the instant exhaust gas purification device 1. Moreover, through cells 32 are disposed along the diagonal directions of this grid and between an inlet-side cell 22 and an inlet-side cell 22 adjacent thereto and between an outlet-side cell 24 and an outlet-side cell 24 adjacent thereto. With this construction, the exhaust gas overflowing from the wall-flow part 20 rapidly flows into the through cells 32, and as a consequence pressure loss increases can be even more effectively suppressed.

A catalyst coating layer (not shown) may additionally be provided in the wall-flow part 20 and the straight-flow part 30. For example, in the wall-flow part 20, a catalyst coating layer can be provided at the surface of the wall 26 and/or in the pores in the interior of the wall 26. A catalyst coating layer formed on the inner wall surface of the through cell 32 can additionally be provided in the straight-flow part 30. In these cases, the catalyst coating layer may contain a porous support and a precious metal catalyst loaded on this support. Such a construction makes it possible to carry out a favorable purification of the harmful components (for example, carbon monoxide (CO), hydrocarbon (HC), $NO_R$, and so forth) in the exhaust gas passing through the wall-flow part 20 and the straight-flow part 30.

The support used for the catalyst coating layer can contain one or two or more elements (typically as the oxide) selected from, e.g., alkali metal elements (typically alkali metal oxides), alkaline-earth metal elements (typically alkaline-earth metal oxides), rare-earth elements (typically rare-earth oxides), Zr (typically zirconia), Si (typically silica), Ti (typically titania), and Al (typically alumina). The use of a support containing these components can realize at least one (and preferably all) of the following: an increase in the mechanical strength, an improvement in durability (thermal stability), an inhibition of catalyst sintering, and an inhibition of catalyst poisoning. The alkaline-earth metal element can be exemplified by magnesium (Mg), calcium (Ca), strontium (Sr), and barium (Ba). The rare-earth metal element can be exemplified by lanthanum (La), scandium (Sc), yttrium (Y), cerium (Ce), praseodymium (Pr), neodymium (Nd), samarium (Sm), and ytterbium (Yb). For example, one or two or more oxides such as alumina ($Al_2O_3$), ceria ($CeO_2$), zirconia ($ZrO_2$), titania ($TiO_2$), silica ($SiO_2$), and so forth, are preferably used.

The precious metal catalyst used in the catalyst coating layer can contain one or two or more elements selected from the platinum group elements. The use of a precious metal catalyst containing these components makes it possible to more reliably purify the harmful components (for example, carbon monoxide (CO), hydrocarbon (HC), NOx, and so forth) in the exhaust gas that passes through the wall-flow part 20 and the straight-flow part 30. The use of rhodium (Rh) in combination with palladium (Pd) or platinum (Pt) is preferred. The use of Rh in combination with Pd or Pt makes possible an even more efficient purification of the harmful components in the exhaust gas. The amount of the precious metal catalyst that is supported is not particularly limited, but approximately 0.5 g to 20 g (preferably 1 g to 10 g) per 1 L of filter volume is preferred. A satisfactory catalytic activity may not be obtained when the amount of supported precious metal catalyst is too small. When the amount of supported precious metal catalyst is too large, the effect due to the loading of the precious metal catalyst tapers off and higher costs are induced, and is thus to be avoided.

The amount of formation of the catalyst coating layer is not particularly limited, but, for example, is preferably approximately 5 g to 500 g (preferably 10 g to 200 g) per 1 L of filter volume. When the amount of the catalyst coating layer per 1 L of filter volume is too small, the functionality as a catalyst coating layer is weak and there is also a risk of causing grain growth by the supported precious metal catalyst. When the amount of the catalyst coating layer is too large, this risks causing an increased pressure loss when the exhaust gas passes through the wall-flow part 20 and the straight-flow part 30.

With regard to the method of loading the catalyst coating layer on the filter, for example, the filter substrate 10 may be immersed in a slurry in which the catalyst components are dispersed. A method can be used in which, after the slurry has been impregnated into the filter substrate 10, drying and firing are carried out in order to immobilize and support the catalyst components at the wall 26 and/or at the inner wall of the through cell 32.

The catalyst coating layer may be formed into a layered structure having an upper layer and a lower layer wherein the lower layer is closer to the surface of the filter substrate 10 and the upper layer is relatively removed therefrom. In this case, for example, Pd or Pt may be supported in one layer separately from Rh in the other layer. By doing this, a suppressing effect can be obtained on the reduction in catalytic activity that is caused by the alloying of Rh with Pd or Pt. This may also be a layered structure of three or more layers that has an additional layer or layers besides the two layers.

Figure 5:
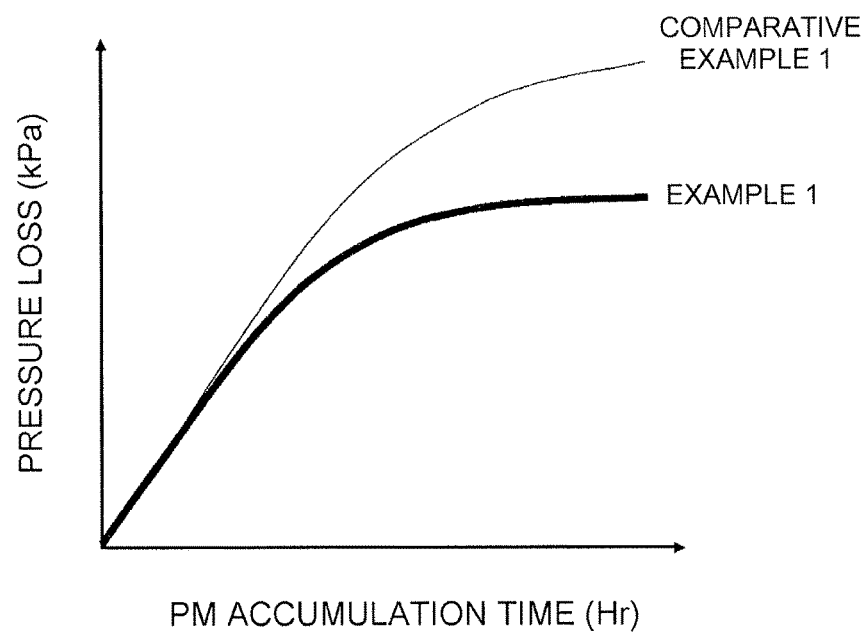
FIG. 5 is a graph showing the relationship between the PM accumulation time and pressure loss.

For the instant exhaust gas purification device 1, the present inventors prepared a filter (Example 1) that was provided with the straight-flow part 30 shown in FIG. 3 and a filter (Comparative Example 1) that was not provided with the straight-flow part 30; introduced exhaust gas under the same conditions for each; and measured the PM accumulation time (hr) and the pressure loss (kPa). Specifically, in each example the exhaust gas purification device was placed in the exhaust system of a gasoline engine and an exhaust gas throughflow was established at a steady-state operation. A pressure sensor was placed before and after the filter. The pressure loss was measured while PM was accumulating in the filter. Here, the difference in the measured values between the two pressure sensors was used as the pressure loss. The results are shown in FIG. 5. As shown in FIG. 5, the exhaust gas purification device (Example 1) that used the filter provided with the straight-flow part 30 gave a lower pressure loss post-PM accumulation than did the exhaust gas purification device (Comparative Example 1) that used the filter lacking the straight-flow part 30. This result confirmed that the increase in pressure loss post-PM accumulation was suppressed by the provision of the straight-flow part 30 in the filter 100.

An exhaust gas purification device 1 according to an embodiment of the present invention has been described in the preceding, but the exhaust gas purification device according to the present invention is not limited to this embodiment.

For example, in the cross section orthogonal to the axial direction of the filter, the cross-sectional areas of the through cells 32 disposed in the straight-flow part 30 are uniformly the same in the embodiment described above. The cross-sectional area of the through cell 32 disposed in the straight-flow part 30 is not limited to this embodiment. For example, as in the filter 200 shown in FIG. 6, the cross-sectional areas of the through cells present in an outer peripheral region B of the filter 200 may be larger than the cross-sectional areas of the through cells present in a central region A.

Figure 6:
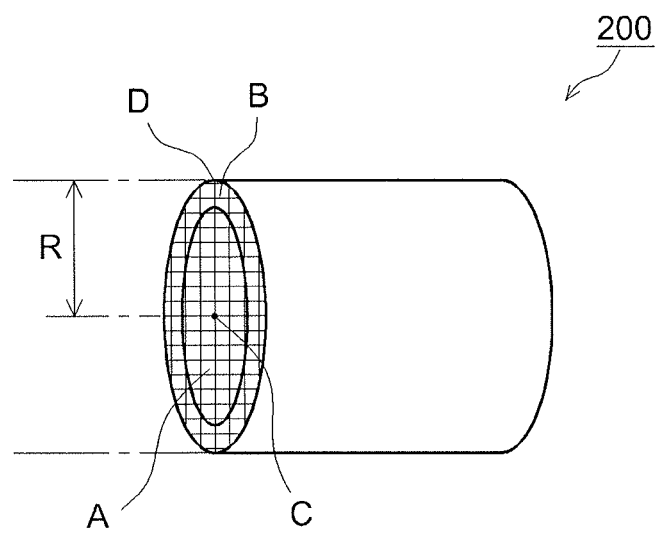
FIG. 6 is a perspective diagram that schematically shows the filter of an exhaust gas purification device according to an embodiment.

For example, in the example shown in FIG. 6, the cross section orthogonal to the axial direction of the filter 200 is approximately circular. In this case, and letting R be the radius of this cross section of the filter 200, for example, the central region A may be defined as the region from the center C of the cross section of the filter 200 to at least ½R (preferably ⅔R, for example, ¾R, and at most ⅘R) of the radius R. The outer peripheral region B may be defined as the region from the outer edge D of the cross section of the filter 200 to at least ⅕R (preferably ¼R, for example, ⅓R, and at most ½R) of the radius R. In this embodiment, the central region A is defined as the region from the center C of the cross section of the filter 200 to ⅘R of the radius R. In addition, the outer peripheral region B is defined as the region from the outer edge D of the cross section of the filter 200 to ⅕R of the radius R.

Figure 7:
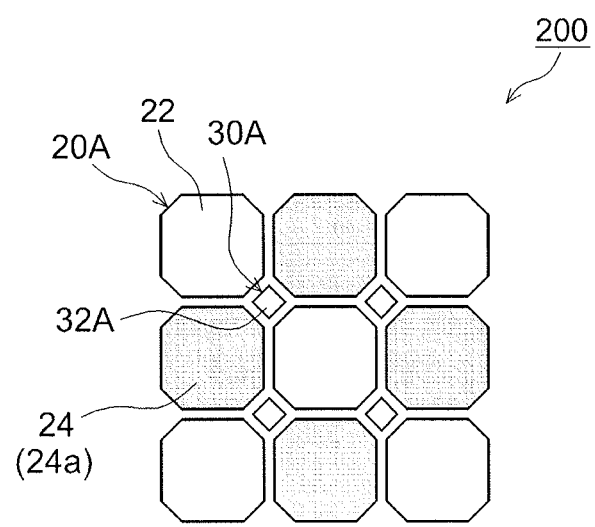
FIG. 7 is a diagram that schematically shows a portion of the end face of a filter according to an embodiment.
Figure 8:
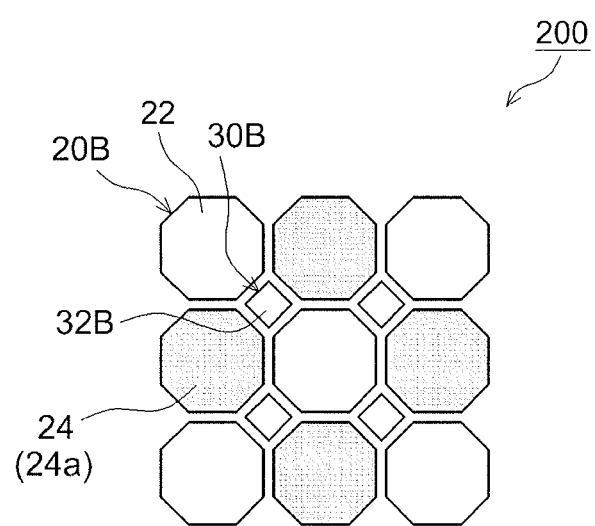
FIG. 8 is a diagram that schematically shows a portion of the end face of a filter according to an embodiment.

FIG. 7 shows a portion of the end face of the exhaust gas inflow side for the central region A. FIG. 8 shows a portion of the end face of the exhaust gas inflow side for the outer peripheral region B. As shown in FIG. 7, the plurality of through cells 32A present in the central region A are formed of quadrilateral cells each having the same cross-sectional area. As shown in FIG. 8, the plurality of through cells 32B present in the outer peripheral region B are formed of quadrilateral cells each having the same cross-sectional area.

As shown in FIG. 7 and FIG. 8, the cross-sectional area of the through cells 32B present in the outer peripheral region B is larger than that of the through cells 32A present in the central region A. For example, the ratio (S3/S4) between the cross-sectional area S3 of a through cell 32A present in the central region A and the cross-sectional area S4 of a through cell 32B present in the outer peripheral region B is suitably not more than approximately ⅔ and is preferably not more than ½ and is particularly preferably not more than ⅓. The area ratio (S3/S4) for the herein disclosed through cells 32A and 32B preferably satisfies $1/10 \leq (S3/S4) \leq 2/3$, more preferably satisfies $1/5 \leq (S3/S4) \leq 1/2$, and particularly preferably satisfies $1/4 \leq (S3/S4) \leq 1/3$. In addition, the cross-sectional area S4 of the through cell 32B present in the outer peripheral region B is preferably at least 0.01 mm$^2$ larger than the cross-sectional area S3 of the through cell 32A present in the central region A and is more preferably at least 0.03 mm$^2$ larger. The herein disclosed art can be advantageously executed with an embodiment in which, for example, the cross-sectional area S4 of the through cell 32B present in the outer peripheral region B is at least 0.05 mm$^2$ larger than the cross-sectional area S3 of the through cell 32A present in the central region A. In this embodiment, the plurality of through cells 32A present in the central region A each have a cross-sectional area S3 of about 0.25 mm$^2$. The plurality of through cells 32B present in the outer peripheral region B, on the other hand, each have a cross-sectional area S4 of about 0.30 mm$^2$. In this embodiment, the cross-sectional areas of the through cells 32B present in the outer peripheral region B are thus uniformly larger than that of the through cells 32A present in the central region A. As described above, a catalyst coating layer may additionally be provided on the inner wall surfaces of the through cells 32A and 32B. When either cell is provided with a catalyst coating layer, the aforementioned area ratio (S3/S4) should be satisfied for the total with the catalyst coating layer for the prescribed amount of the coating.

As shown in FIG. 7 and FIG. 8, in this embodiment the cross-sectional area of the inlet-side cell 22B and the outlet-side cell 24B present in the outer peripheral region B is smaller than the cross-sectional area of the inlet-side cell 22A and the outlet-side cell 24A present in the central region A. For example, the ratio (S5/S6) between the cross-sectional area S5 of the inlet-side cell 22A and the outlet-side cell 24A present in the central region A and the cross-sectional area S6 of the inlet-side cell 22B and the outlet-side cell 24B present in the outer peripheral region B is suitably at least approximately 20/19 and is preferably at least 15/14 and is particularly preferably at least 10/9 (for example, at least 32/27). This area ratio (S5/S6) for the herein disclosed inlet-side cells 22A, 22B and outlet-side cells 24A, 24B preferably satisfies $20/19 \leq (S5/S6) \leq 2$, more preferably satisfies $15/14 \leq (S5/S6) \leq 3/2$, and particularly preferably satisfies $10/9 \leq (S5/S6) \leq 4/3$. In addition, the cross-sectional area S5 of the inlet-side cell 22A and the outlet-side cell 24A present in the central region A is preferably at least 0.1 mm$^2$ larger and more preferably at least 0.3 mm$^2$ larger than the cross-sectional area S6 of the inlet-side cell 22B and the outlet-side cell 24B present in the outer peripheral region B. The herein disclosed art can be advantageously executed with an embodiment in which, for example, the cross-sectional area S5 of the inlet-side cell 22A and the outlet-side cell 24A present in the central region A is at least 0.5 mm$^2$ larger than the cross-sectional area S6 of the inlet-side cell 22B and the outlet-side cell 24B present in the outer peripheral region B. In this embodiment, the plurality of inlet-side cells 22A and outlet-side cells 24A present in the central region A each have a cross-sectional area S5 of approximately 3.2 mm$^2$. The plurality of inlet-side cells 22B and outlet-side cells 24B present in the outer peripheral region B, on the other hand, each have a cross-sectional area S6 of approximately 2.7 mm$^2$.

In a herein disclosed preferred embodiment, in the central region A the ratio (S5/S3) between the cross-sectional area S5 of the inlet-side cell 22A and the outlet-side cell 24A and the cross-sectional area S3 of the through cell 32A is suitably at least approximately 6 and is preferably at least 10 and particularly preferably at least 12. This area ratio (S5/S3) for the inlet-side cell 22A, the outlet-side cell 24A, and the through cell 32A present in the central region A preferably satisfies $6 \leq (S5/S3) \leq 20$, more preferably satisfies $10 \leq (S5/S3) \leq 18$, and particularly preferably satisfies $12 \leq (S5/S3) \leq 15$. In addition, the cross-sectional area S5 for the inlet-side cell 22A and the outlet-side cell 24A present in the central region A is preferably at least 2 mm² larger and is more preferably at least 2.5 mm² larger than the cross-sectional area S3 of the through cell 32A present in the central region A. The herein disclosed art, for example, can be advantageously executed using an embodiment in which the cross-sectional area S5 of the inlet-side cell 22A and the outlet-side cell 24A present in the central region A is at least 2.9 mm² larger than the cross-sectional area S3 of the through cell 32A present in the central region A.

In a herein disclosed preferred embodiment, in the outer peripheral region B the ratio (S6/S4) between the cross-sectional area S6 of the inlet-side cell 22B and outlet-side cell 24B and the cross-sectional area S4 of the through cell 32B is suitably at least approximately 5, preferably at least 6, and particularly preferably at least 9. This area ratio (S6/S4) for the inlet-side cell 22B, the outlet-side cell 24B, and the through cell 32B present in the outer peripheral region B preferably satisfies 5≤(S6/S4)≤20, more preferably satisfies 6≤(S6/S4)≤15, and particularly preferably satisfies 9≤(S6/S4)≤12. The cross-sectional area S6 of the inlet-side cell 22B and outlet-side cell 24B present in the outer peripheral region B preferably is at least 1.5 mm² larger and more preferably is at least 2 mm² larger than the cross-sectional area S4 of the through cell 32B present in the outer peripheral region B. The herein disclosed art, for example, can be advantageously executed using an embodiment in which the cross-sectional area S6 of the inlet-side cell 22B and the outlet-side cell 24B present in the outer peripheral region B is at least 2.4 mm² larger than the cross-sectional area S4 of the through cell 32B present in the outer peripheral region B.

Here, a large exhaust gas flow rate occurs in high engine operating load regions (for example, when the air intake for a 2.0-L engine is 20 g/sec or more), and due to this there is then a tendency for the exhaust gas to flow in the filter 200 as a whole. On the other hand, a low exhaust gas flow rate occurs in low engine operating load regions (for example, when the air intake for a 2.0-L engine is less than 20 g/sec), and due to this there is then a tendency for the exhaust gas to be concentrated in the central region A of the filter 200. In this embodiment, the cross-sectional area of the through cell 32B present in the outer peripheral region B is larger than the cross-sectional area of the through cell 32A present in the central region A. Due to this, the exhaust gas flows more easily in the through cell 32B (straight-flow part 30B) in the outer peripheral region B of the filter 200 than in the central region A. With the instant filter 200, in a high engine operating load region a large flow rate is assumed by the exhaust gas flowing in the straight-flow part 30B of the outer peripheral region B. As a consequence, pressure loss increases can be effectively restrained in particular in high engine operating load regions.

In this case, for the example of an average flow rate condition of 15 to 30 m³/min and assigning 100% (volume) to the total amount of exhaust gas passing through the central region A, the configuration is preferably such that the amount of exhaust gas passing through the straight-flow part 30A of the central region A is not more than 10% (more preferably 2% to 5% and particularly preferably 3±1%). Stated differently, for the state prior to PM accumulation, the configuration is preferably such that at least 90% (more preferably 95% to 98% and particularly preferably 97±1%) of the total amount of exhaust gas flowing in the central region A flows in the wall-flow part 20A. The aforementioned effect can be realized at even higher levels at within the indicated range for the exhaust gas flow amount ratio.

In addition, for the example of an average flow rate condition of 15 to 30 m³/min and assigning 100% to the total amount of exhaust gas passing through the outer peripheral region B, the configuration is preferably such that the amount of exhaust gas passing through the straight-flow part 30B of the outer peripheral region B is 1% to 15% (more preferably 3% to 10% and particularly preferably 5±1%). Stated differently, for the state prior to PM accumulation, the configuration is preferably such that 85% to 99% (more preferably 90% to 97% and particularly preferably 95±1%) of the total amount of exhaust gas flowing in the outer peripheral region B flows in the wall-flow part 20B. When the exhaust gas flow amount ratio is within the indicated range, pressure loss increases can be suppressed without causing a reduction in the PM trapping efficiency.

3.2 mm² was used in the embodiment shown in FIG. 7 and FIG. 8 for the cross-sectional area S5 of the inlet-side cell 22A and the outlet-side cell 24A present in the central region A. The cross-sectional area S5 of the inlet-side cell 22A and the outlet-side cell 24A present in the central region A is not limited to this. For example, the cross-sectional area S5 of the inlet-side cell 22A and the outlet-side cell 24A present in the central region A can be set to approximately 9 mm² or less (for example, at least 3 mm² and not more than 9 mm²).

In addition, 2.7 mm² was used in the aforementioned embodiment for the cross-sectional area S6 of the inlet-side cell 22B and the outlet-side cell 24B present in the outer peripheral region B. The cross-sectional area S6 of the inlet-side cell 22B and the outlet-side cell 24B present in the outer peripheral region B is not limited to this. For example, the cross-sectional area S6 of the inlet-side cell 22B and the outlet-side cell 24B present in the outer peripheral region B can be set to approximately 8.6 mm² or less (for example, at least 2.8 mm² and not more than 8.6 mm²).

Also, 0.25 mm² was used in the aforementioned embodiment for the cross-sectional area S3 of the through cell 32A present in the central region A. The cross-sectional area S3 of the through cell 32A present in the central region A is not limited to this. For example, the cross-sectional area S3 of the through cell 32A present in the central region A can be set to approximately 1.5 mm² or less (for example, at least 0.1 mm² and not more than 1.5 mm²).

Also, 0.3 mm² was used in the aforementioned embodiment for the cross-sectional area S4 of the through cell 32B present in the outer peripheral region B. The cross-sectional area S4 of the through cell 32B present in the outer peripheral region B is not limited to this and also should be larger than the cross-sectional area S3 of the through cell 32A present in the central region A. For example, the cross-sectional area S4 of the through cell 32B present in the outer peripheral region B can be set to approximately 1.8 mm² or less (for example, at least 0.11 mm² and not more than 1.8 mm²).

An even better expression of the previously described effects can be obtained at within the indicated ranges for the cross-sectional areas S3 to S6 of the cells 22A, 24A, 22B, 24B, 32A, and 32B.

Figure 9:
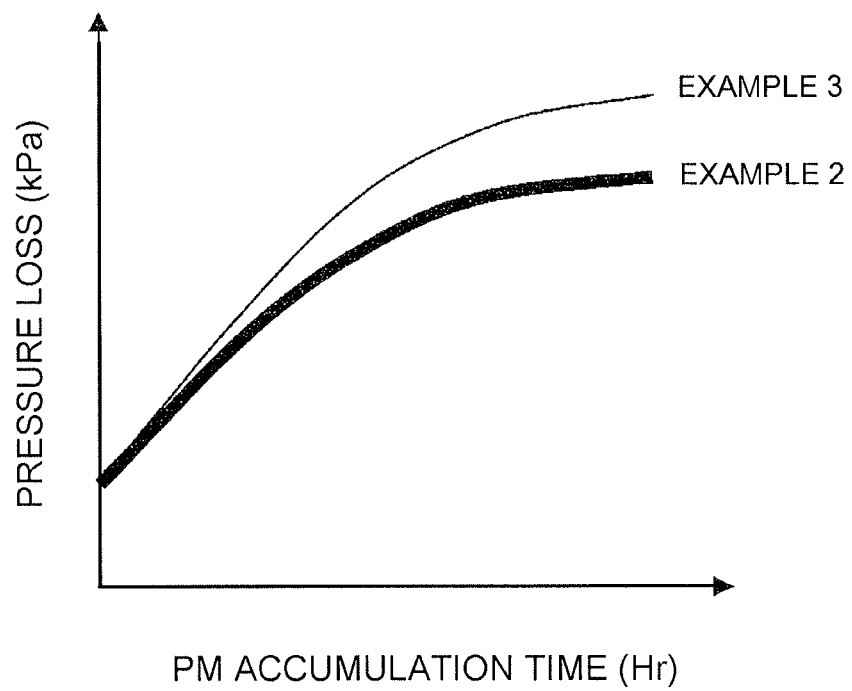
FIG. 9 is a graph that shows the relationship between the PM accumulation time and pressure loss.

For the instant exhaust gas purification device, the present inventors prepared a filter (Example 2) as shown in FIG. 6 to FIG. 8 in which the cross-sectional area of the through cell 32B in the outer peripheral region B was larger than that of the through cell 32A in the central region A and a filter (Example 3) in which the through cells 32A and 32B in the two regions had the same size; introduced exhaust gas under the same conditions for each; and measured the PM accumulation time (Hr) and the pressure loss (kPa). Specifically, in each example the exhaust gas purification device was placed in the exhaust system of a gasoline engine and an exhaust gas throughflow was established at a steady-state operation. A pressure sensor was placed before and after the filter. The pressure loss was measured while PM was accumulating in the filter. Here, the difference in the measured values between the two pressure sensors was used as the pressure loss. The results are shown in FIG. 9. As shown in FIG. 9, the exhaust gas purification device (Example 2) that used the filter in which the cross-sectional area of the through cell 32B in the outer peripheral region B was larger than that of the through cell 32A in the central region A, had an even lower pressure loss post-PM accumulation than did the exhaust gas purification device (Example 3) that used the filter in which the through cells 32A and 32B in the two regions had the same size. This result confirmed that the increase in pressure loss post-PM accumulation was suppressed even better by making the cross-sectional area of the through cell 32B in the outer peripheral region B larger than that of the through cell 32A in the central region A.

In the example shown in FIG. 6, FIG. 7, and FIG. 8, the cross-sectional area of the through cell 32B present in the outer peripheral region B is uniformly larger than the cross-sectional area of the through cell 32A present in the central region A. The cross-sectional areas of the through cells 32A and 32B formed in the filter are not limited to this embodiment. For example, as in the filter 300 shown in FIG. 10, through cells may be formed for which the cross-sectional area undergoes a gradual (stepwise) increase moving toward the outer edge D from the center C in the cross section.

Figure 10:
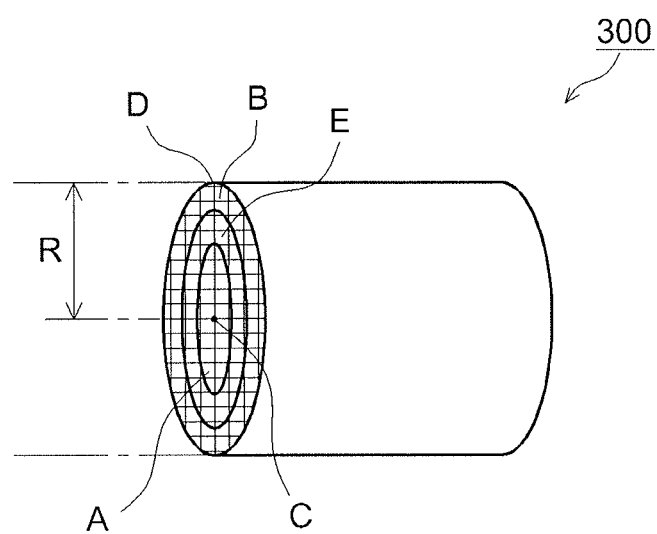
FIG. 10 is a perspective diagram that schematically shows a filter according to an embodiment.

In the example shown in FIG. 10, the central region A is defined as the region out to ½R of the radius R from the center C of the cross section of the filter 300. The outer peripheral region B is defined as the region to ⅛R of the radius R from the outer edge D of the cross section of the filter 300. In addition, an intermediate region E is defined as the region not included by the outer peripheral region B and the central region A. In this case, the through cells formed in the central region A may have the smallest cross-sectional area. The through cells formed in the intermediate region E may have a cross-sectional area larger than that of the through cells formed in the central region A. Moreover, through cells having the largest cross-sectional area may be formed in the outer peripheral region B. Thus, in the filter 300 shown in FIG. 10, the through cells are formed with cross-sectional areas that undergo a stepwise increase moving from the center C of the cross section to the outer edge D.

With the use of this filter 300, in the filter 300 the amount of exhaust gas passing through the through cells (straight-flow part) can be more finely tuned moving from the center C of the cross section of the filter 300 to its outer edge D. This in turn makes possible a more reliable and secure suppression of pressure loss increases. Also in this case, through a suitable selection of the sizes of the cross-sectional areas of the through cells in the central region A, the intermediate region E, and the outer peripheral region B, pressure loss increases can be suppressed without impairing the PM trapping efficiency.

In the filter 300 shown in FIG. 10, the through cells have been divided into three stages in terms of the size of the cross-sectional area moving from the center C of the cross section of the filter 300 to its outer edge D; however, there is no limitation to this embodiment. For example, when a plurality of rows of through cells are formed from the center C of the filter cross section to its outer edge D, the cross-sectional area may gradually increase with each row moving from the center C of the cross section of the plurality of through cell rows to the outer edge D.

In another embodiment, the through cells (straight-flow part) may be omitted from the central region A and the intermediate region E of the filter. Thus, the unplugged through cells (straight-flow part) may be provided only in the outer peripheral region B of the filter. Again in this case, through a suitable selection of the size of the cross-sectional area of the through cells in the outer peripheral region B, pressure loss increases can be suppressed without impairing the PM trapping efficiency.

Various examples of modifications of the exhaust gas purification device 1 and particularly the particulate filter have been provided above as examples, but the structure of the exhaust gas purification device 1 and the particulate filter are not limited to or by any of the embodiments described in the preceding. In addition, the shape and structure of the individual members and positions of the exhaust gas purification device 1 may also be altered. This exhaust gas purification device 1 is, for example, particularly suitable as a device that captures the PM present in an exhaust gas having a relatively high exhaust temperature, such as a gasoline engine. However, the exhaust gas purification device 1 according to the present invention is not limited to the application of capturing the PM in the exhaust gas from a gasoline engine and can be used in various applications for capturing the PM in the exhaust gas discharged from other types of engines (for example, diesel engines).

INDUSTRIAL APPLICABILITY

The present invention can provide an exhaust gas purification device that can inhibit increases in the pressure loss by the filter.

The invention claimed is:

1. An exhaust gas purification device disposed in an exhaust passage of an internal combustion engine and provided with a particulate filter capturing particulate matter in an exhaust gas discharged from the internal combustion engine, the particulate filter comprising a filter substrate, wherein the filter substrate comprises:
   a plurality of inlet-side cells being open at an end of the filter substrate on the exhaust gas inflow side and plugged at an end of the filter substrate on the exhaust gas outflow side;
   a plurality of outlet-side cells being adjacent to the inlet-side cells and open at the end of the filter substrate on the exhaust gas outflow side and plugged at the end of the filter substrate on the exhaust gas inflow side;
   a wall being a porous structure that permits the exhaust gas to pass through the wall and being formed between the inlet-side cell and the outlet-side cell; and
   a plurality of through cells being open and not plugged at either end of the filter substrate,
   wherein the plurality of inlet-side cells and the plurality of outlet-side cells are disposed in alternation in a grid, and each of the through cells is disposed between adjacent ones of the plurality of inlet-side cells and between adjacent ones of the plurality of outlet-side cells along a diagonal direction of the grid, and wherein in a cross section of the filter substrate orthogonal to an axial direction of the filter substrate, an outer peripheral region and a central region of the cross section are provided with respectively a plurality of the through cells, a cross-sectional area of each of the through cells present in the outer peripheral region of this cross section is larger than a cross-sectional area of each of the through cells present in the central region of the cross section.

2. The exhaust gas purification device according to claim 1, configured such that an amount of exhaust gas passing through the through cells is 0.1% to 10% when 100% is a total amount of exhaust gas passing through the filter.

3. The exhaust gas purification device according to claim 1, wherein
   a through cell cross section orthogonal to the axial direction of the filter substrate has a quadrilateral shape, and
   an inlet-side cell cross section orthogonal to the axial direction of the filter substrate and an outlet-side cell cross section orthogonal to the axial direction of the filter substrate have an octagonal shape.

4. The exhaust gas purification device according to claim 1, wherein
   a cross section of the filter substrate orthogonal to the axial direction is circular, and when the radius of this cross section is defined as R,
   the central region is defined as a region from the center of the cross section to at least ½R of the radius R, and
   the outer peripheral region is defined as a region from the outer edge of the cross section to at least ⅕R of the radius R.

5. The exhaust gas purification device according to claim 1, configured such that when 100% is a total amount of exhaust gas passing through the central region, the amount of exhaust gas passing through the through cells of the central region is not more than 10%.

6. The exhaust gas purification device according to claim 1, configured such that when 100% is a total amount of exhaust gas passing through the outer peripheral region, the amount of exhaust gas passing through the through cells of the outer peripheral region is 1% to 15%.

7. The exhaust gas purification device according to claim 1, wherein
   the cross-sectional areas of the respective through cells present in the outer peripheral region are equal to one another and are uniformly larger than the cross-sectional areas of the through cells present in the central region.

8. The exhaust gas purification device according to claim 1, wherein in the filter substrate, through cells are formed which have cross-sectional areas gradually increasing from the center of the aforementioned cross section toward the outer edge.

9. The exhaust gas purification device according to claim 1, wherein the internal combustion engine is a gasoline engine.

10. A particulate filter disposed in an exhaust passage of an internal combustion engine and capturing particulate matter in an exhaust gas discharged from the internal combustion engine, the particulate filter comprising a filter substrate, wherein the filter substrate comprises:
    a plurality of inlet-side cells being open at an end of the filter substrate on the exhaust gas inflow side and plugged at an the end of the filter substrate on the exhaust gas outflow side;
    a plurality of outlet-side cells being adjacent to the inlet-side cells and open at the end of the filter substrate on the exhaust gas outflow side and plugged at the end of the filter substrate on the exhaust gas inflow side;
    a wall being a porous structure that permits the exhaust gas to pass through the wall and being formed between the inlet-side cell and the outlet-side cell; and
    a plurality of through cells being open and not plugged at either end of the filter substrate wherein the plurality of inlet-side cells and the plurality of outlet-side cells are disposed in alternation in a grid, and each of the through cells is disposed between adjacent ones of the plurality of inlet-side cells and between adjacent ones of the plurality of outlet-side cells along a diagonal direction of the grid and wherein in a cross section of the filter substrate orthogonal to an axial direction of the filter substrate, an outer peripheral region and a central region of the cross section are provided with respectively a plurality of the through cells, a cross-sectional area of each of the through cells present in the outer peripheral region of this cross section is larger than a cross-sectional area of each of the through cells present in the central region of the cross section.

* * * * *